United States Patent Office 3,173,883
Patented Mar. 16, 1965

3,173,883
METHOD FOR PRODUCING ATTRITION RESISTANT SORPTIVE ALUMINA PARTICLES
Edward B. Cornelius, Swarthmore, Pa., Robert G. Craig, Wilmington, Del., Raymond B. Cross, Wenonah, N.J., Hubert A. Shabaker, Media, Pa., and David E. Field, Pitman, N.J., assignors to Air Products and Chemicals, Inc., a corporation of Delaware
No Drawing. Filed Dec. 6, 1960, Ser. No. 73,987
3 Claims. (Cl. 252—448)

This invention relates to activated alumina catalyst carriers and, more particularly, to methods for preparing small, hard spheroidal alumina carriers which are rugged and have high resistance to attrition and abrasion.

Activated aluminas have long been used as carriers for various types of catalysts for use in various chemical processes and manufacturing industries. However, the need for more rugged, harder, more resistant catalyst carriers increases as catalysts are applied to more and more industrial processes and as additional new uses are developed for catalysts. As an example, activated alumina is a common base or carrier at the present time for such varied catalysts as platinum, cobalt molybdate and chromia in the various catalytic reforming and cracking processes used by the petroleum industry. Also, as a result of pollution problems emanating from the tremendous increase in use of automobiles and other gasoline-burning equipment, the need has arisen for rugged, high attrition-resistant and abrasion-resistant catalyst carriers for catalysts suitable for use in completing the combustion of hydrocarbons and carbon monoxide in the exhausts from internal combustion engines.

Many attempts have been made heretofore to provide alumina catalyst carriers of sufficient hardness and strength to withstand the severe conditions of attrition and abrasion to which they are subjected by modern industrial processes. Continuing efforts are being expended towards developing new types of catalyst carriers which will meet the ever-increasingly severe demands of newly developed uses for catalysts. These attempts have met with some success in the past in increasing the ruggedness and resistance to abrasion or attrition of alumina carriers either by adding various other materials as hardeners and tougheners or by subjecting the alumina to special hardening and/or toughening treatments. In many cases, the alumina carrier thus treated or thus modified lost adsorptive capacity or was so expensive as to prove impractical.

The present invention provides an alumina carrier in the form of small, hard, rugged spheres of substantially uniform size and having extremely high resistance to attrition and abrasion under severe conditions. This invention provides spheroidal alumina carriers from activated or activatable alumina particles and a suitable binding material without the need of additional hardeners or other similar materials and without the need of additional modifying treatments.

It is therefor an object of this invention to provide an alumina catalyst carrier which is hard, rugged and resistant to abrasion.

Another object is the provision of an alumina catalyst carrier in the form of small, hard, spheroidal particles of substantially uniform size throughout and novel processes for making the same.

Another object is the provision of a process for making such spheroidal alumina carriers by the use of a novel aging step which greatly reduces aging time and/or increases hardness.

Another object is the provision of a process for making spheroidal alumina carriers, which process is characterized by high economy in raw materials utilization and low raw materials losses.

Other objects and advantages will become apparent from the following detailed description.

It has been discovered in accordance with this invention that when fine powders and coarse powders of hydrated alumina are mixed with an acid binder, e.g., phosphoric acid, and mulled or mixed, for a period of time, that small spheroidal pellets are obtained which, after subsequent aging and activation, form hard alumina pellets of extreme ruggedness and resistance to abrasion and/or attrition. It has also been discovered in accordance with this invention that the fines or oversized and undersized pellets resulting from this process or, for that matter, resulting from other carrier-preparing processes, when ground to a suitable powder, and combined with fresh alumina hydrate will produce hard, rugged spheroidal alumina pellets when used in the process of this invention. A further discovery in accordance with this invention is that pellets which are aged or hardened under controlled, high humidity conditions become even harder and/or require less time for aging or hardening to a desired degree of hardness.

The basic process of this invention is carried out by mixing an activated or activatable fine powder of alumina in hydrated or dehydrated condition with a coarse powder of hydrated alumina, adding an acid binder such as phosphoric acid, mulling the mixture for a period of time sufficient to give the desired size of spheroids, and then hardening and activating the spheroids. The predominant size of the spheroidal material can be controlled to give alumina spheroids having a desired diameter, e.g., one sixty-fourth inch, one-sixteenth inch, three thirty-seconds of an inch and the like.

The fine and coarse alumina powders can be the same or different and can be any of the activatable aluminas such as the trihydrates, bayerite or gibbsite, or mixtures thereof alone or with the monohydrate boehmite. The preferred activatable aluminas for use herein are gibbsite and bayerite alone or mixed together. Such mixtures of these hydrates are obtained by controlled aging of gelatinous alumina, as taught by Weiser et al. in U.S. Patent No. 2,406,420. When mixtures of trihydrate and monohydrate are employed, it is preferred to use 25 to 75 weight percent of gibbsite or bayerite or of a mixture of both and 75 to 25 weight percent of boehmite. The coarse alumina powder employed has an average diameter of about 0.03 to 0.07 mm., the predominance of its particles being in the size range of 0.01 to 0.10 millimeter. The fine alumina powder employed has a predominance of its particles of not more than 5 micron size, preferably below 1 micron, in size. The proportion of fines to coarse powder is not narrowly critical and it is preferred to use a coarse-fine mixture containing 10 to 50 weight percent fine powder and 90 to 50 weight percent coarse powder. It is preferable to thoroughly blend coarse and fine powders, e.g., in a ribbon blender or similar equipment, in order to obtain a uniform, spheroidal product.

The acid binders are well-known and include generally the mineral acids, e.g., phosphoric acid, nitric acid, hydrochloric acid, mixtures of acetic acid and nitric acid, and metal Lewis salts such as aluminum nitrate, aluminum chloride and the like. Phosphoric acid is the preferred acid binder since it has been found to provide the highest hardness of those specifically listed. The amount of acid binder to be employed is not narrowly critical and can be varied over a wide range. Alumina spheroids of excellent hardness and ruggedness can be obtained by using, in the process herein described, an amount of acid binder sufficient to stoichiometrically combine with 5 to 15 weight percent of the $Al_2O_3$ content of the hydrated alumina mixture.

The acid binder is most conveniently added as a solution in water. The concentration of the acid binder solution is critical only insofar as the amount of liquid added affects the consistency of the resulting mixture. The amount of liquid should be sufficient to provide an adhesive mixture of extrudable consistency which will tend to adhere together and agglomerate when squeezed and which is not so dry as to crumble when squeezed and not so wet that it flows as a viscous liquid or slurry. The exact overall amount of liquid which will provide a suitable consistency cannot be given in precise figures, since consistency depends also on such factors as the nature of the specific alumina used, the nature of the acid binder employed, the proportion of coarse to fine aluminas employed and the like. For example, as the proportion of coarse to fine aluminas is increased, all other variables being the same, less liquid is needed to give the suitable consistency, optimum ease of spheroid-formation and optimum hardness of the ultimate, aged and activated alumina spheroids. A range of liquid-to-solids ratio convenient to use is one liter of liquid to 5 to 10 kilograms of the hydrated alumina on a dry basis at 105° C.

It has been found that the liquid-to-solids ratio and time of mixing or mulling the alumina powder-acid binder mixture can be varied to control the size of the alumina spheroid; an increase in liquid-to-solids ratio increases the predominant size of the alumina spheroids and a longer mix- or mull-time increases the predominant size. Too great a mix-time tends to produce agglomerates at the expense of discrete spheroids. Also, shorter mix-times give drier spheroids whereas longer mix-times result in wetter spheroids. Exact figures for the liquid-to-solids ratio and mix-time which will produce spheroids of a particular size cannot be given since such figures depend upon the particular mixer used and the particular materials used. However, in any one particular mixer using any particular materials, the above-mentioned relationships of mix-time and liquid-solids ratio to spheroid size hold true. It has been found also that the longer mix-times give harder spheroids after aging and activating.

Mixing to obtain spheroidal alumina pellets can be performed in any suitable type of mixer, for example, a Lancaster, counter-current, muller-type mixer; a Simpson muller-mixer, a rolling drum mixer or a balling machine.

The problem of storing the wet spheroidal pellets for a sufficient length of time to permit adequate hardening can be minimized, if desired, by storing the wet spheroids in an atmosphere of controlled, high humidity to reduce or eliminate water evaporation. Aging at ambient conditions, i.e., at room temperature exposed to the drying atmosphere, requires one or two days to obtain the hardness desired. It has been found, however, that aging of the wet spheroidal pellets in an atmosphere of controlled high humidity, e.g., in a sealed container, requires less time than wet pellets aged at ambient conditions for a comparable hardness. It, furthermore, has been found that increased hardness is obtained when the wet pellets are aged under controlled, high humidity conditions for a similar length of time as pellets aged at ambient conditions. The time of aging can be further reduced to several minutes by heating the wet pellets in such controlled, high humidity conditions which reduce or eliminate water evaporation from the pellets, and pellets of similar or increased hardness are obtained. After sufficient aging under such high humidity conditions, the aged pellets can be air-dried at room temperature or oven-dried at elevated temperature without loss of hardness, before calcining to activate; or these can be directly calcined without intermediate separate drying.

Activation of the aged pellets is carried out by calcining in accordance with the usual methods.

In any pellet alumina manufacturing process, there are also formed oversized and undersized pellets and fine powders. It has been found that losses due to such materials of undesired size range can be minimized or eliminated by screening out these over- and under-sized pellets and powders and regrinding these, in dried (uncalcined) state, to suitable size powder which is reincorporated in the fresh alumina coarse-fine mixture prior to or during the addition of the acid-binder. The amount of acid-binder then used is the same as if the total amount of alumina including the reincorporated powders were fresh hydrated alumina. The amount of reincorporated alumina powder is not narrowly critical and up to 50% based on the weight of the combined amount of fresh alumina and reincorporated alumina can be used.

The following example is presented to illustrate one embodiment of the invention, all percentages being by weight.

A blend of coarse and fine alumina trihydrates was prepared from (a) 9.07 kg. of gibbsite coarse powder having a screen analysis of 0 to 0.6%—larger than 100 mesh, 0 to 8.0%—between 100 and 200 mesh, 20 to 40%—between 200 and 325 mesh, and 60 to 80%—between 0.01 mm. and 325 mesh; and (b) 4.54 kg. of gibbsite fine powder having an average size of about 0.05 micron. Orthophosphoric acid in an amount of 2000 cc. of a 39% aqueous solution was added as a continuous stream over one to three minutes while mixing in a size SKG Lancaster mixer. Mixing was continued for 30 minutes, resulting in alumina spheroids of a size in the range of one sixty-fourth inch to one-eighth inch in diameter with a predominance of the spheroids of one-sixteenth inch diameter. The time of mixing after addition of all the acid which produces optimum results was found to be 10 to 30 minutes for these particular ingredients and amounts and this particular equipment.

The spheroids were then air-dried at room temperature for 24 to 48 hours and then calcined at 800° F. The resulting spheroids were remarkably hard, rugged and resistant to abrasion and attrition. An increase in hardness was obtained in a similar run by moderately increasing the acid dosage with care to avoid agglomeration of the spheroids due to increased acid.

Instead of air-aging the spheroids at room temperature for 48 hours, they can be aged for 24 hours in a closed container or otherwise under conditions avoiding loss of moisture, followed by air-drying at room temperature for 24 hours to increase the hardness of the calcined spheroids. Aging at increased temperature reduces the time required.

The same procedure was subsequently followed using the dried (uncalcined) reground over- and under-sized powders resulting from a previous run. The over- and under-sized powders were reground to 325 mesh or finer and used in the same process in place of fresh alumina trihydrate. The resulting yield in desired size range of spheroids was equivalent to that obtained from fresh alumina trihydrate, thus providing a significant increase in overall yield. The particle hardness, ruggedness and resistance to abrasion and attrition was also equivalent to that of spheroids made from fresh almina trihydrate.

Many modifications and variations of the invention as hereinbefore set forth can be made without departing from the spirit and scope thereof, and therefore only such limitations should be imposed as are indicated in the appended claims.

What is claimed is:

1. In the method of making particles of sorptive alumina in which particles of hydrated alumina are calcined at a temperature of about 800° F. to transform the hydrated alumina precursor particles into sorptive alumina particles the improvement which consists of: preparing a mixture consisting essentially of from 50% to 90% of coarse hydrated alumina particles having a predominant diameter range of about 10 to about 100 microns and from 10% to 50% of a pulverized hydrated alumina particles having a predominant diameter of not more than about 1 micron; adding to the resulting mixture of hydrated aluminas an aqueous acidic solution in an amount corresponding to 1 liter of solution for each five to ten kilograms of hydrated alumina, the acid being sufficient to stoichiometrically combine with about 5 to about 15 percent by weight of the alumina in the hydrated alumina to prepare a moist, adhesive mass having an extrudable consistency tending to adhere together and agglomerate when squeezed; mixing said moist, adhesive mass sufficiently to form precursor particles having a spheroidal ball shape; aging the precursor particles in the presence of high humidity at conditions at which evaporation of water from the particles is substantially eliminated; subjecting the thus aged precursor particles to calcination; and cooling the calcined particles to provide sorptive alumina particles.

2. In the method of making spherical particles of sorptive alumina in which particles of hydrated alumina are calcined at a temperature of about 800° F. to transform the hydrated alumina into a sorptive alumina, the improvement which consists of: preparing a mixture of coarse alumina trihydrate particles having a diameter greater than about 10 microns and a pulverized alumina trihydrate having an average particle size less than about 1 micron, the coarse particles being present in a quantity about twice the weight of the pulverized particles; adding about two liters of an aqueous solution of ortho phosphoric acid per about 13 kilograms of alumina trihydrate so that the resulting adhesive mixture has an extrudable consistency tending to adhere together and agglomerate when squeezed; mulling the mixture to bring about the formation of small balls of precursor particles; aging the precursor particles for at least 24 hours in the presence of high humidity at conditions at which evaporation of water from the particles is substantially eliminated; drying the thus aged particles; and subjecting the thus dried precursor particles to calcination to provide sorptive alumina particles.

3. The method of enhancing the attrition resistance and impact resistance of sorptive alumina particles which consists of: preparing a mixture consisting predominantly of coarse particles of hydrated alumina having a predominant diameter range of about 10 to about 100 microns and a lesser amount of pulverized hydrated alumina particles having a particle size less than 1 micron; admixing the mixture of alumina hydrate particles with a lesser amount of an aqueous solution of ortho phosphoric acid to prepare a moist, adhesive mass having an extrudable consistency tending to adhere together and agglomerate when squeezed; mixing said moist, adhesive mass sufficiently to form precursor particles having a spheroidal ball shape; aging the precursor particles comprising the coarse hydrated alumina, the lesser amount of pulverized hydrated alumina, and the still smaller amount of an aqueous solution of ortho phosphoric acid by heating the precursor particles in the presence of high humidity at conditions at which evaporation of water from the particles is substantially eliminated; drying the aged particles; calcining the thus aged and humidified spherical balls of precursor at a temperature of about 800° F. to transform the hydrated alumina precursor particles into sorptive alumina particles; cooling the calcined balls; and withdrawing impact-resistant, attrition-resistant sorptive alumina balls as the product of the method.

References Cited in the file of this patent

UNITED STATES PATENTS

| | | |
|---|---|---|
| 2,296,406 | Spicer et al. | Sept. 22, 1942 |
| 2,545,441 | Barrett | Mar. 20, 1951 |
| 2,662,860 | Engel et al. | Dec. 15, 1953 |
| 2,933,766 | Bickford et al. | Apr. 26, 1960 |
| 2,952,644 | Holden | Sept. 13, 1960 |